C. H. PALMER.
Cigar-Molds.
No. 136,615.    Patented March 11, 1873.
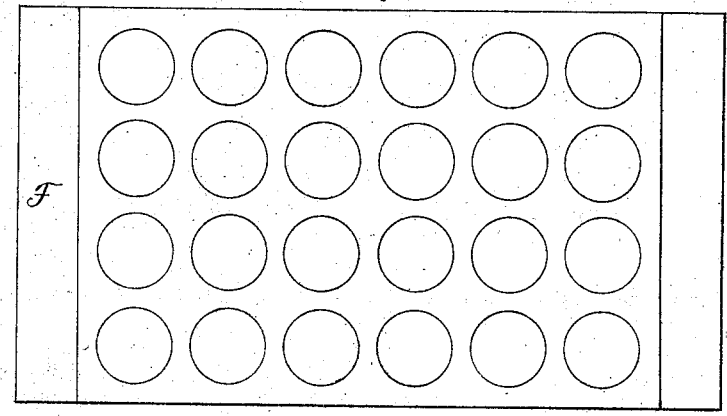
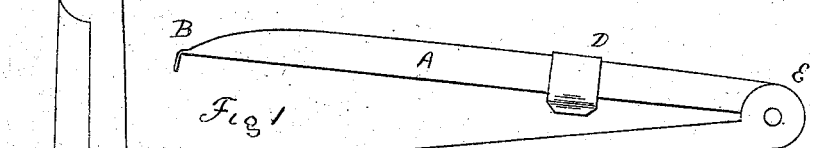
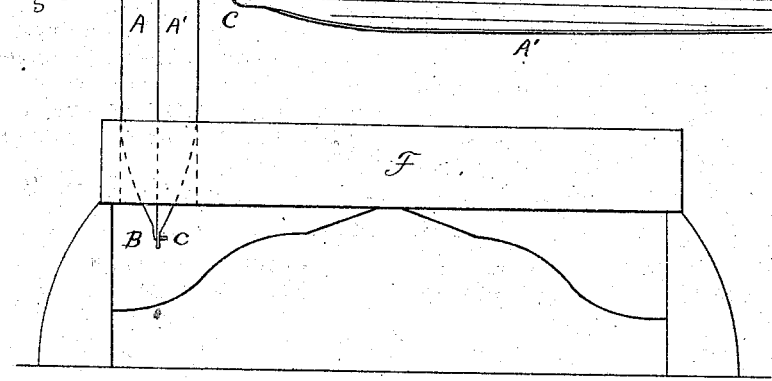
Witnesses
E. G. Woolfolk
Herman Clark
Inventor
Charles H. Palmer
by his Atty.
Wm. C. Hicks

UNITED STATES PATENT OFFICE.

CHARLES H. PALMER, OF NEW YORK, N. Y.

IMPROVEMENT IN CIGAR-MOLDS.

Specification forming part of Letters Patent No. 136,615, dated March 11, 1873.

*To all whom it may concern:*

Be it known that I, CHARLES H. PALMER, of the city, county, and State of New York, have invented a new and useful Cigar-Drying Mold, and I do hereby declare that the following is a full, clear, and exact description and specification of the same, reference being had to the annexed drawing making part of this specification.

The object of my invention is to furnish a cigar-drying mold which shall be cheap in construction, durable, and convenient for use; and to this end my invention consists in a certain combination of guiding lips and clasps with the sides of a hinged cigar-mold, set forth specifically at the end of this specification.

In order that persons skilled in the art may make and use my invention, I will proceed to describe a cigar-mold with my improvements, having reference to the annexed drawing, in which—

Figure 1 represents my cigar-mold open, ready to receive a cigar.

It is composed substantially of two hollow jaws shaped to the sides of a cigar, and hinged at one end. The whole mold is made of thin metal struck up in dies, the ends E being pressed together to form the male and female parts of a hinge. The jaw A has lips D soldered to it, as shown in Fig. 1; these lips serve as guides for the sides of the jaw A', so that when they are brought in contact with the sides of jaw A a perfect union is effected. The jaw A is provided also with a tongue, B, which enters between the lips C on the jaw A', when they are brought together to guide the tips of the jaws and for the purpose of opening the jaws.

The operation is as follows: The jaws are opened, turning on the hinge E, a cigar is placed in one of the hollow jaws, and the other jaw is brought toward it, and the mold closed. The whole mold containing the cigar is then placed in a vertical position in the rack F, provided with holes to receive a number of them. When the cigar is properly dried they are removed and refilled.

Having now described my invention, what I claim, and desire to secure by Letters Patent, is—

A sheet-metal mold for drying cigars, consisting of two hollow jaws hinged together at one end, and provided with male and female clasps at their tips, and lips at their sides for guiding and holding the jaws in place, as set forth.

CHARLES H. PALMER.

Witnesses:
  JOHN F. GARVEY,
  WM. C. HICKS.